(12) United States Patent
Ertimo et al.

(10) Patent No.: US 11,936,445 B2
(45) Date of Patent: Mar. 19, 2024

(54) METHOD FOR OPTIMIZING ANTENNA DIRECTIONS IN A COMMUNICATIONS NETWORK

(71) Applicant: Elisa Oyj, Helsinki (FI)

(72) Inventors: Riku Ertimo, Helsinki (FI); Karri Sunila, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/037,687

(22) PCT Filed: Nov. 8, 2021

(86) PCT No.: PCT/FI2021/050753
§ 371 (c)(1),
(2) Date: May 18, 2023

(87) PCT Pub. No.: WO2022/106750
PCT Pub. Date: May 27, 2022

(65) Prior Publication Data
US 2023/0403050 A1      Dec. 14, 2023

(30) Foreign Application Priority Data

Nov. 23, 2020    (FI) ..................................... 20206189

(51) Int. Cl.
*H04L 23/02*      (2006.01)
*H04B 7/0452*     (2017.01)
*H04L 5/00*       (2006.01)

(52) U.S. Cl.
CPC ......... *H04B 7/0452* (2013.01); *H04L 5/0023* (2013.01)

(58) Field of Classification Search
CPC .... H04B 7/0617; H04B 17/102; H04B 17/17; H04B 17/3912; H04B 7/0452; H04B 7/10; H04W 24/04; H04W 24/02; H04W 16/28
(Continued)

(56) References Cited

U.S. PATENT DOCUMENTS

| 7,299,071 B1 * | 11/2007 | Barratt ................. H04B 7/0697 455/562.1 |
| 10,349,287 B2 | 7/2019 | Faxér et al. |

(Continued)

FOREIGN PATENT DOCUMENTS

| EP | 1639846 B1 | 2/2010 |
| EP | 2712224 A1 | 3/2014 |

(Continued)

OTHER PUBLICATIONS

European Patent Office, Written Opinion of the International Searching Authority, Application No. PCT/FI2021/050753, dated Feb. 24, 2022, 10 pages.

(Continued)

*Primary Examiner* — Khai Tran
(74) *Attorney, Agent, or Firm* — Ziegler IP Law Group

(57) ABSTRACT

A computer implemented method for optimizing directions of antennas of a base station of a communications network is provided. The method includes receiving antenna sector configuration data with sector information of each antenna and an azimuth angle of a main antenna direction of each antenna; receiving performance indicators of multiple subsectors of each antenna sector; calculating a cost function value indicating inter-sector impact between neighboring subsectors of adjacent sectors based on the performance indicators for the current antenna configuration and for at least one other possible antenna configuration; and identi- (Continued)

fying an antenna configuration yielding minimum cost function value of the calculated values as an optimized antenna configuration.

12 Claims, 5 Drawing Sheets

(58) Field of Classification Search
USPC .......................................... 375/262, 260, 267
See application file for complete search history.

(56) References Cited

U.S. PATENT DOCUMENTS

| 2011/0136478 | A1* | 6/2011 | Trigui | H04W 24/02 |
| | | | | 455/418 |
| 2015/0156651 | A1 | 6/2015 | Nilsson et al. | |
| 2015/0351103 | A1* | 12/2015 | Kim | H04W 16/28 |
| | | | | 455/561 |
| 2018/0041908 | A1 | 2/2018 | Faxér et al. | |

FOREIGN PATENT DOCUMENTS

| FI | 130029 B | 12/2022 |
| WO | 2013000424 A1 | 1/2013 |
| WO | 2014045096 A1 | 3/2014 |
| WO | 2015152931 A1 | 10/2015 |

OTHER PUBLICATIONS

Finnish Patent and Registration Office, Communication of Acceptance, Application No. 20206189, dated Nov. 7, 2022, 4 pages.
Finnish Patent and Registration Office, Decision—application accepted, Application No. 20206189, dated Dec. 30, 2022, 1 page.
Finnish Patent and Registration Office, Search Report, Application No. 20206189, dated Jun. 9, 2021, 2 pages.
Saraydar, C.U. et al., "Adaptive Cell Sectorization for CDMA Systems.", IEEE Journal on Selected Areas in Communications, vol. 19 No. 6, Jun. 2001, 11 pages.

* cited by examiner

METHOD FOR OPTIMIZING ANTENNA DIRECTIONS IN A COMMUNICATIONS NETWORK

TECHNICAL FIELD

The present disclosure generally relates to optimizing directions of antennas of a base station of a communications network. The disclosure relates particularly, though not exclusively, to optimizing an azimuth angle of a beam forming antenna.

BACKGROUND

This section illustrates useful background information without admission of any technique described herein representative of the state of the art.

Cellular communications networks are complex systems comprising a plurality of cells serving users of the network. A coverage area of a base station of a communications network may consist of multiple sectors, each sector having its own antenna element.

Presently, antennas of a base station of a communications network are directed such that coverage of the base station is maximized. The orientation of antennas and antenna sectors may be selected e.g. based on assumed location of users on the coverage area of base station.

Document US2015/156651 Teaches optimizing antenna directions by adjusting antenna directions so that energy transmitted from the antenna is concentrated to a traffic hotspot.

A new approach for optimizing the antenna directions is provided.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the present disclosure.

According to a first example aspect there is provided a computer implemented method for optimizing directions of antennas of a base station of a communications network. The method comprises:
  receiving antenna sector configuration data comprising sector information of each antenna and an azimuth angle of a main antenna direction of each antenna;
  receiving performance indicators of multiple subsectors of each antenna sector;
  calculating a cost function value indicating inter-sector impact between neighboring subsectors of adjacent sectors based on the performance indicators for the current antenna configuration and for at least one other possible antenna configuration; and
  identifying an antenna configuration yielding minimum cost function value of the calculated values as an optimized antenna configuration.

In an example embodiment, the antenna sectors are horizontal opening angles or opening areas of that antenna; the antennas are beamforming antennas; and the subsectors are beams of the respective beamforming antenna.

In an example embodiment, the method further comprises providing output information indicating the optimized antenna configuration.

In an example embodiment, the method further comprises providing output information indicating the difference of the cost function values of the current antenna configuration and the optimized antenna configuration.

In an example embodiment, the cost function is such that it provides minimum value when performance indicators of the neighboring subsectors of adjacent sectors indicate minimum load or the cost function is such that it provides minimum value when the main antenna direction is aligned with a subsector having the highest performance indicator indicating load.

In an example embodiment, the cost function value is calculated based on sample counts of a performance indicator of the subsectors and/or sample scaling factors determined based on the count of the performance indicator samples in adjacent subsectors of adjacent sectors.

In an example embodiment, the base station comprises 2 sectors or 3 sectors or 4 or more sectors.

In an example embodiment, sector comprises 1-128 subsectors, for example 4, 6, 7, 8, or more subsectors.

In an example embodiment, the method further comprises that responsive to detecting that the difference of the cost function values of the current antenna configuration and the optimized antenna configuration is greater than a pre-defined threshold value, an antenna configuration change is deployed.

In an example embodiment, the optimized antenna configuration is additionally used to optimize direction of an antenna comprising single subsector, if any, of the same base station.

According to a second example aspect of the disclosed embodiments, there is provided an apparatus comprising a processor and a memory including computer program code; the memory and the computer program code configured to, with the processor, cause the apparatus to perform the method of the first aspect or any related embodiment.

According to a third example aspect of the disclosed embodiments, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

A base station of a communications network may comprise multiple antennas. Combined coverage area of the antennas forms the coverage area of the base station. Each antenna of a base station covers a particular predefined sector of the horizontal plane. An antenna opening angle defines an antenna sector. In the horizontal direction, an azimuth angle of a main antenna direction defines a direction of the sector covered by that antenna. An antenna sector may comprise multiple subsectors. In an embodiment, a base station may comprise 1, 2, 3, 4 or more sectors, and each sector comprises a plurality of subsectors. There may be for example 4, 6, 8, or more subsectors. In an example embodiment, each sector comprises 1-128 subsectors. In an example embodiment, the sectors may be unequal and/or the sectors may comprise different number of subsectors. In an example embodiment, a sector is a horizontal opening angle or opening area of a beamforming antenna and subsectors are beams (radiation lobes) of the beamforming antenna. In an example embodiment, a base station may comprise 2, 3, or 4 beamforming antennas, and each antenna may comprise up to 128 beams. In an example embodiment, a base station comprises 2, 3, or 4 beamforming antennas and 1-8 beams. In an example embodiment, a base station comprises 2, 3, or 4 beamforming antennas and 4, 6, or 7 beams. In an example embodiment, a base station comprises 3 beamforming antennas and 4-8 beams.

If antennas are directed such that multiple users are between the sectors, that is multiple users a located near sector edges, there may be inter-sector impact between two or more antenna sectors of that base station. The inter-sector impact may indicate interference between antenna sectors and/or overlap between antenna sectors. The inter-sector impact between the antenna sectors may decrease the capacity of the communications network.

Various embodiments of present disclosure provide optimization of antenna directions based on minimizing inter-sector impact. Inter-sector impact is analyzed and minimized based on impact between neighboring subsectors of adjacent sectors. That is, the analysis is focused on sector edges. The configuration that minimizes the inter-sector impact is identified as an optimized antenna configuration. The optimization aims at finding such sector directions that result for example in minimization of the load near sector edges. That is, instead of optimization of antenna directions by concentrating on increasing capacity on traffic hot spots, various embodiments provide minizing inter-sector impact.

Figure 1A:
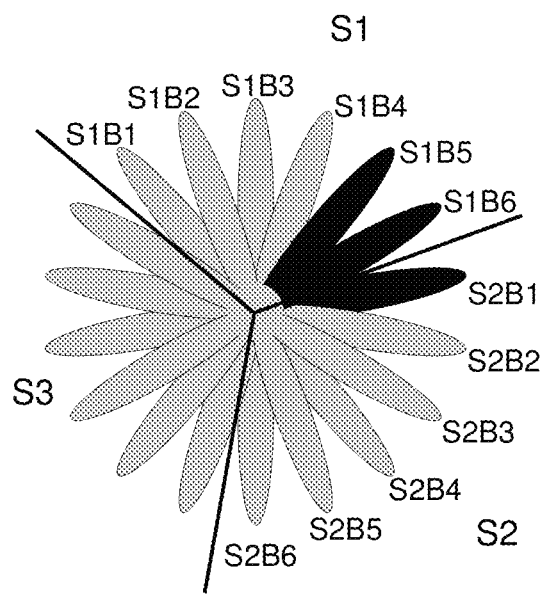
FIG. 1 schematically shows antenna sectors and antenna subsectors of a base station.
Figure 1B:
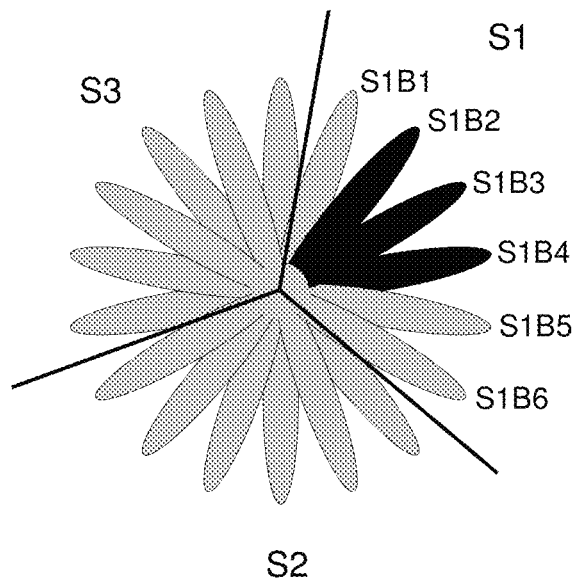

FIG. 1 shows an example of antenna sectors S1-S3 and antenna subsectors S1B1-S1 B6, S2B1-S2B6 of a base station comprising 3 beamforming antennas each having 6 beams. In the example of FIG. 1A, beams S1 B5 and S1 B6 of antenna sector S1 and beam S2B1 of antenna sector S2 experience high load whereas the other beams experience smaller load. Thus, there may be inter-sector impact between beams S1 B6 and S2B1, i.e., inter-sector impact between antenna sectors S1 and S2. The inter-sector impact may have an effect on throughput and reduce the capacity of the network. In the example of FIG. 1B, the antennas are rotated or redirected such that main antenna direction of sector S1 is aligned with direction of high load and sector borders coincide with directions of lower load. Now redirected beams S1 B2-S1 B4 experience the high load. Inter-sector impact between the redirected sectors S1-S3 is decreased and the capacity of the network may be increased.

Figure 2A:
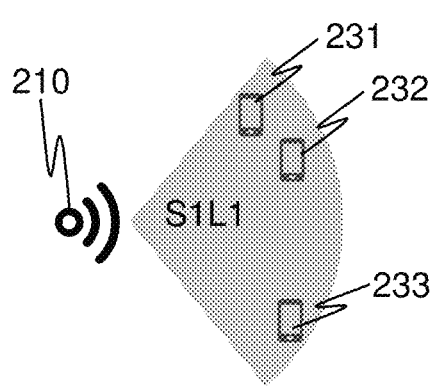
FIG. 2 schematically shows antenna patterns of a conventional antenna and a beamforming antenna.
Figure 2B:
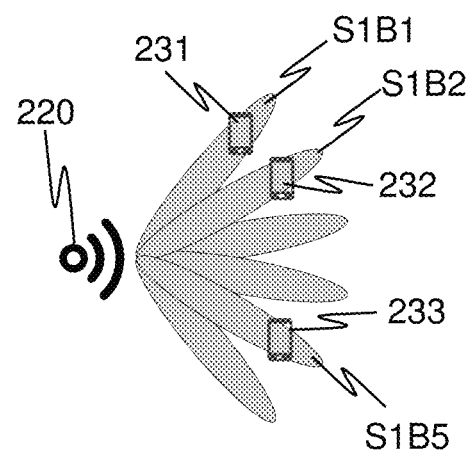

FIG. 2 shows antenna patterns of a conventional antenna (2A) and a beamforming antenna (2B). In the example of FIG. 2A, an antenna 210 emits a single radiation lobe S1L1 forming an antenna sector. User equipment (UE) 231-233 are coupled to the antenna 210 through the same radiation lobe S1L1. In contrast, in FIG. 2B, a beamforming antenna 220 emits beams S1 B1-S1 B6 to an antenna sector. UE 231-233 couple to the antenna 220 through beams S1B1, S1 B2, and S1 B5, respectively, so that approximate location of UE inside the sector is inherently provided. The UE location data may be used to determine the optimized antenna directions.

In the schematic illustrations of beams of beamforming antennas in FIGS. 1A-B and 2B, the separation of the beams is exaggerated. In other embodiments, the beams may have various shapes, the beams may be partially overlapping, and/or the beams may have different sizes.

Figure 3:
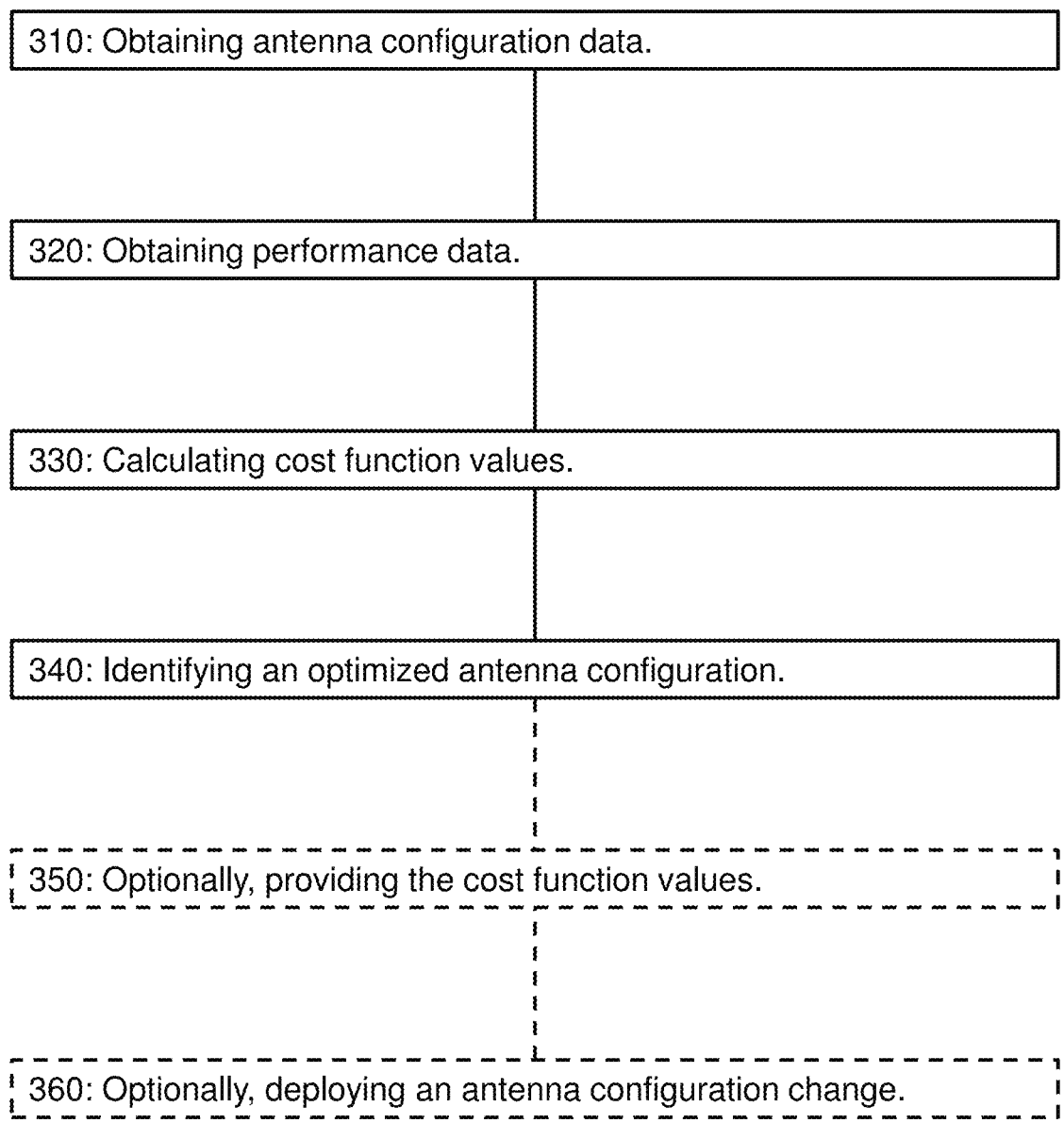
FIG. 3 shows a flow chart of a method according to an example embodiment.

FIG. 3 shows a flow chart of a method according to an example embodiment, wherein a computer implemented method for optimizing antenna directions is provided. FIG. 3 illustrates a method comprising various possible steps including some optional steps while also further steps can be included and/or some of the steps can be performed more than once:

310: Obtaining antenna configuration data. In an embodiment, the configuration data comprises a base station identification and location, sector configuration, and subsector configuration. The configuration data may comprise an azimuth angle of the main antenna direction. The configuration data may further comprise other communications network configuration data, e.g., identification and location data of neighboring base stations. In an embodiment, the antennas are beamforming antennas, a sector is an opening angle or a coverage area of an antenna, and a subsector is a coverage area of a beam.

320: Obtaining performance data. The performance data comprises performance indicators of one or more antenna sectors of the base station, and performance indicators of one or more subsectors of the one or more antenna sectors. That is, the performance data comprises information about the subsector it belongs to. In an embodiment, the performance indicators represent the amount of load in the respective subsector. The performance indicators may comprise number of users, amount of traffic, signal power, throughput, channel quality indicator (CQ), and/or other signal performance indicators. Additionally, the performance data may comprise other performance indicators of the communications network.

330: Calculating cost function values based on the performance data and the antenna configuration data. The cost function value indicates inter-sector impact between neighboring subsectors of adjacent sectors based on the performance indicators. The cost function value calculation may use absolute performance indicator values or number of performance indicator samples in each subsector (that is, how many performance indicator samples there are in each subsector). The cost function value is calculated for the current antenna configuration and for at least one other possible antenna configuration. In an embodiment, the cost function value is calculated for multiple other possible antenna configurations. In an example embodiment, the cost function value is calculated for all the possible antenna configurations enabled by the current subsector configuration. In example embodiment, the cost function value indicates inter-sector impact between neighboring subsectors of adjacent sectors. Indicators taken into account in calculation of the inter-sector impact may comprise channel quality indicator (CQ) and/or throughput indicator. For example, inter-sector impact may increase a need for error-correction that decreases the amount of transferred data, and thus decreasing the throughput. Additionally or alternatively, soft handover overhead and/or mobility counters indicating the share of intra versus inter site mobility may be taken into account. In an example embodiment, the cost function is such that it provides minimum value when performance indicators of the neighboring subsectors of adjacent sectors indicate minimum load, i.e. when the sector borders coincide with directions of lower load. In an example embodiment, the cost function is such that it provides minimum value when performance indicators of the neighboring subsectors of adjacent sectors indicate minimum number of users.

340: Identifying an optimized antenna configuration. In an embodiment, antenna configuration yielding the minimum cost function value is identified as the optimized antenna configuration. In an embodiment, output information indicating the optimized antenna configuration is provided.

350: Optionally, providing the cost function values. In an embodiment, output information indicating the difference of the cost function values of the current antenna configuration and the optimized antenna configuration is provided. In an embodiment, output information comprises all the calculated cost function values.

360: Optionally, deploying an antenna configuration change. In an embodiment, responsive to detecting that the difference of the cost function values of the current antenna configuration and the optimized antenna configuration is greater than a pre-defined threshold value, an antenna configuration change is deployed. In an example embodiment, directions of other antennas of the base station are optimized based on the optimized direction of the antennas receiving performance indicators of multiple subsectors of each antenna sector.

Figure 4:
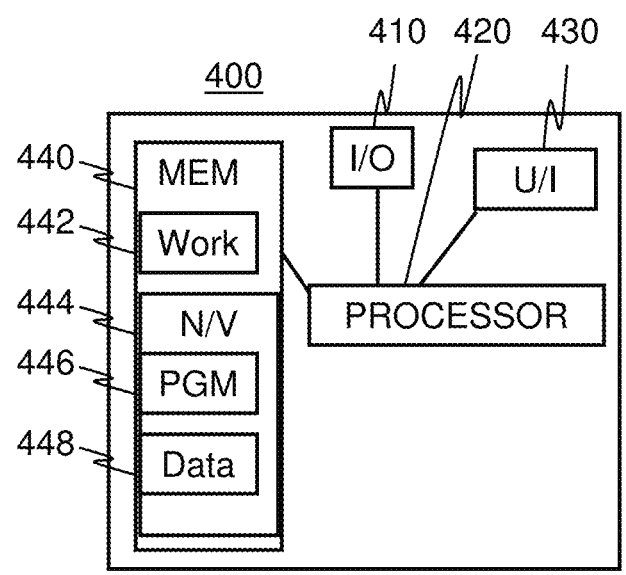
FIG. 4 shows a block diagram of an apparatus according to an example embodiment.

FIG. 4 shows a block diagram of an apparatus 400 according to an example embodiment. The apparatus 400 comprises a communication interface 410; a processor 420; a user interface 430; and a memory 440.

The communication interface 410 comprises in an embodiment a wired and/or wireless communication circuitry, such as Ethernet; Wireless LAN; Bluetooth; GSM; CDMA; WCDMA; LTE; and/or 5G circuitry. The communication interface can be integrated in the apparatus 400 or provided as a part of an adapter, card or the like, that is attachable to the apparatus 400. The communication interface 410 may support one or more different communication technologies. The apparatus 400 may also or alternatively comprise more than one of the communication interfaces 410.

The processor 420 may be a central processing unit (CPU), a microprocessor, a digital signal processor (DSP), a graphics processing unit, an application specific integrated circuit (ASIC), a field programmable gate array, a microcontroller or a combination of such elements.

The user interface may comprise a circuitry for receiving input from a user of the apparatus 400, e.g., via a keyboard, graphical user interface shown on the display of the apparatus 400, speech recognition circuitry, or an accessory device, such as a headset, and for providing output to the user via, e.g., a graphical user interface or a loudspeaker.

The memory 440 comprises a work memory 442 and a persistent memory 444 configured to store computer program code 446 and data 448. The memory 440 may comprise any one or more of: a read-only memory (ROM); a programmable read-only memory (PROM); an erasable programmable read-only memory (EPROM); a random-access memory (RAM); a flash memory; a data disk; an optical storage; a magnetic storage; a smart card; a solid state drive (SSD); or the like. The apparatus 400 may comprise a plurality of the memories 440. The memory 440 may be constructed as a part of the apparatus 400 or as an attachment to be inserted into a slot, port, or the like of the apparatus 400 by a user or by another person or by a robot. The memory 440 may serve the sole purpose of storing data, or be constructed as a part of an apparatus 400 serving other purposes, such as processing data.

A skilled person appreciates that in addition to the elements shown in FIG. 4, the apparatus 400 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 400 may comprise a disposable or rechargeable battery (not shown) for powering the apparatus 400 when external power if external power supply is not available.

Figure 5A:
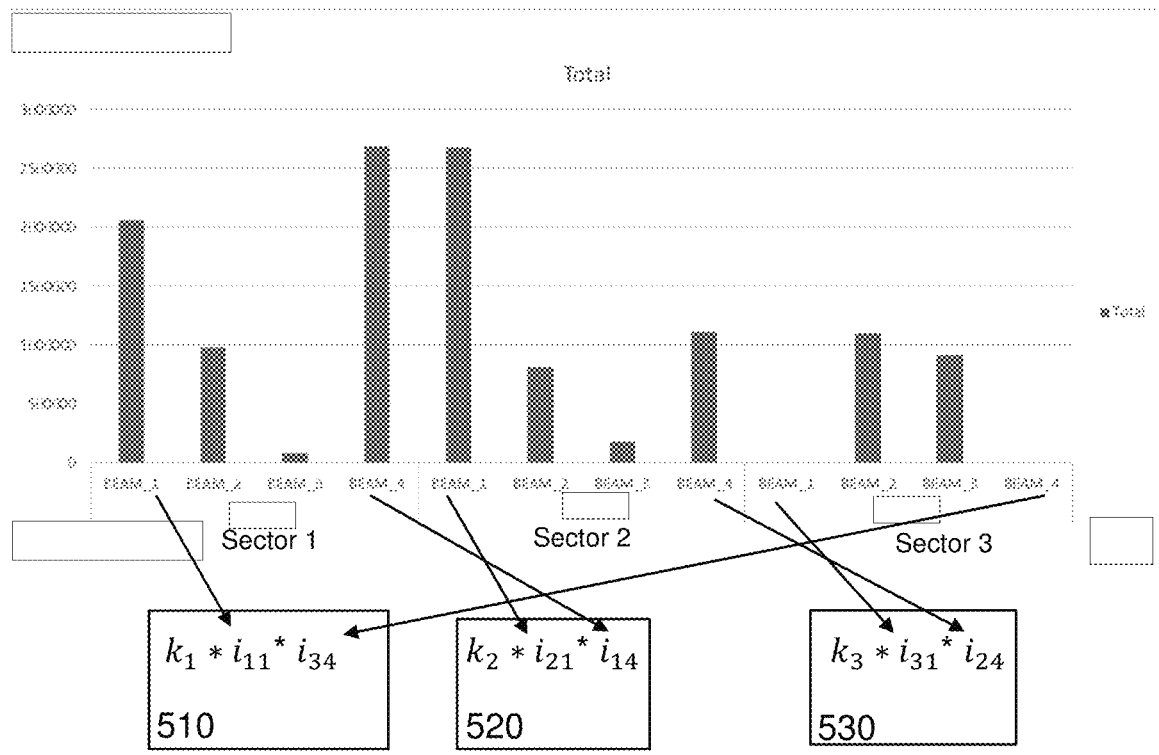
FIGS. 5A-5B show example embodiments of cost function calculations.
Figure 5B:
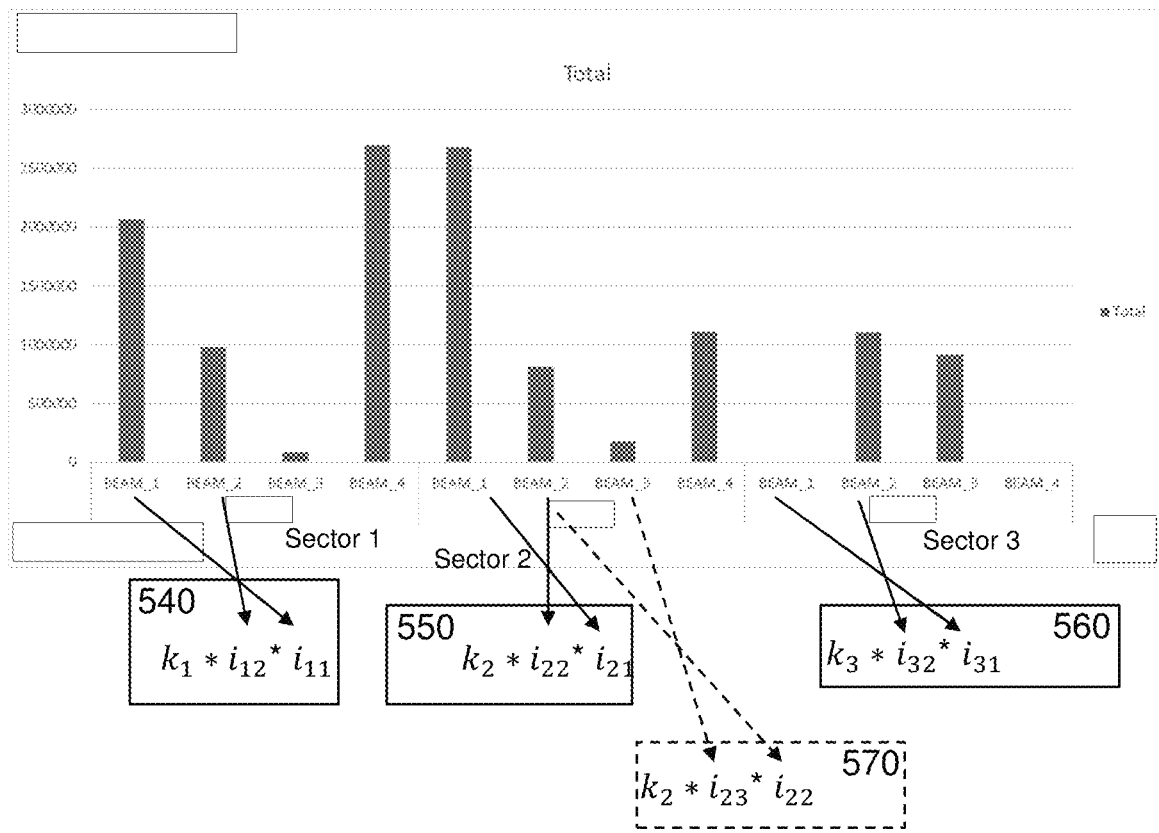

FIGS. 5A-5B show example embodiments of cost function calculations. In this example, the cost function value is calculated based on sample counts of a performance indicator of each subsector and sample scaling factors determined based on count of the performance indicator samples in adjacent subsectors of adjacent sectors. Additionally, a protection factor may be used in the calculation. This example employs the count of performance indicator samples, but equally also absolute values of the performance indicator samples may be used in alternative embodiments. The example comprises beamforming antenna with 3 antenna sectors 1-3 and each antenna sector comprises 4 subsectors BEAM_1, BEAM_2, BEAM_3, BEAM_4. The antennas have same horizontal opening angles and uniform azimuth distribution, e.g. 0, 120, and 240 degrees. FIG. 5A shows a cost function calculation for the current antenna configuration. The cost function value is calculated as $k_1 i_{11} i_{34} + k_2 i_{21} i_{14} + k_3 i_{31} i_{24}$, where $i_{sb}$ describes number samples of beam b of sector s, $k_1 = \max(\min(i_{11}/i_{34}, i_{34}/i_{11}), N)$, $k_2 = \max(\min(i_{21}/i_{14}, i_{14}/i_{21}), N)$, and $k_3 = \max(\min(i_{31}/i_{24}, i_{24}/i_{31}), N)$ are sample scaling factors, and N is a protection factor between 0 and 1. Sample scaling factors $k_s$ are thus calculated from the number of samples of neighboring beams of adjacent sectors. The first term 510 describes inter-sector impact between sectors 1 and 3, the second term 520 describes inter-sector impact between sectors 1 and 2, and the third term 530 describes inter-sector impact between sectors 2 and 3. The arrows indicate which beams contribute to each of the terms. In this example, the second term 520 has a high contribution to the cost function value since BEAM_4 of sector 1 and BEAM_1 of sector 2 both have a high number of samples indicating inter-sector impact between the sectors. FIG. 5B shows an example of cost function calculation for another possible antenna configuration, wherein the sector borders would be rotated between BEAM_1 and BEAM_2 of sector 1, the first term 540, between BEAM_1 and BEAM_2 of sector 2, the second term 550, and between BEAM_1 and BEAM_2 of sector 3, the third term 560. The cost function value is then calculated as $k_1 i_{12} i_{11} + k_2 i_{22} i_{21} + k_3 i_{32} i_{31}$, and the sample scaling factors $k_s$ are calculated for the rotated sector configuration. In another example, the antennas may comprise non-uniform azimuth distribution and/or different opening angles as indicated by an alternative term 570 indicated with the dashed lines in FIG. 5B. In this example, a sector border would be between BEAM_2 and BEAM_3 of sector 2 instead of BEAM_1 and BEAM_2 of sector 2 and the second term 550 in the cost function would be replaced by the alternative term 570. It is to be noted that these calculations do not require any physical changes in the antenna directions. Instead, different configurations can be evaluated based on performance data obtained for one initial antenna configuration. If needed, physical changes may be performed based on the evaluation results.

Figure 6A:
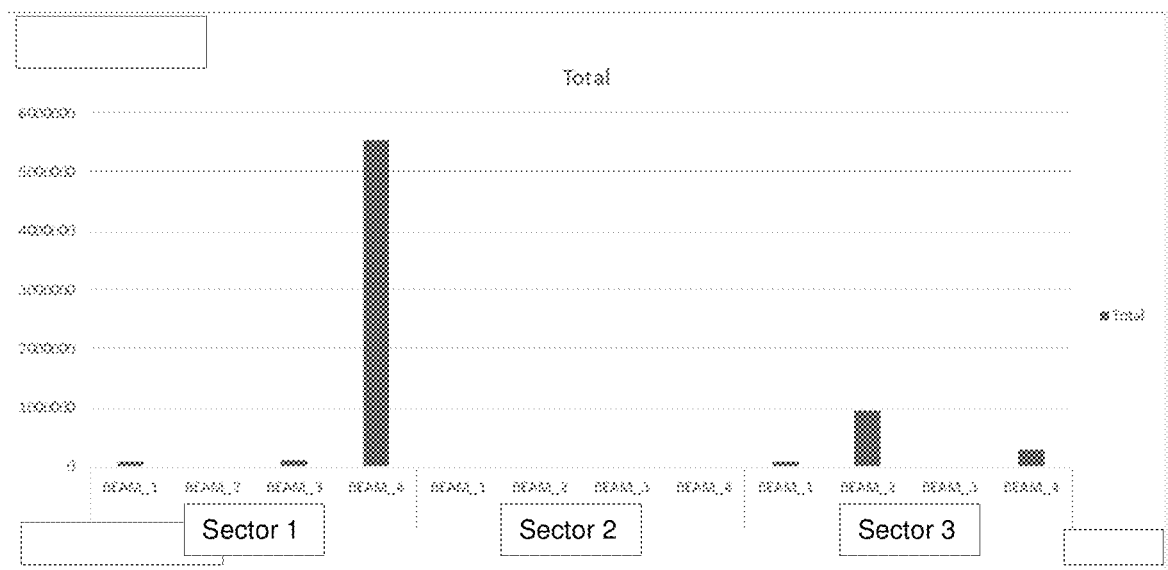
FIGS. 6A-6B show examples of optimizing antenna configurations.
Figure 6B:
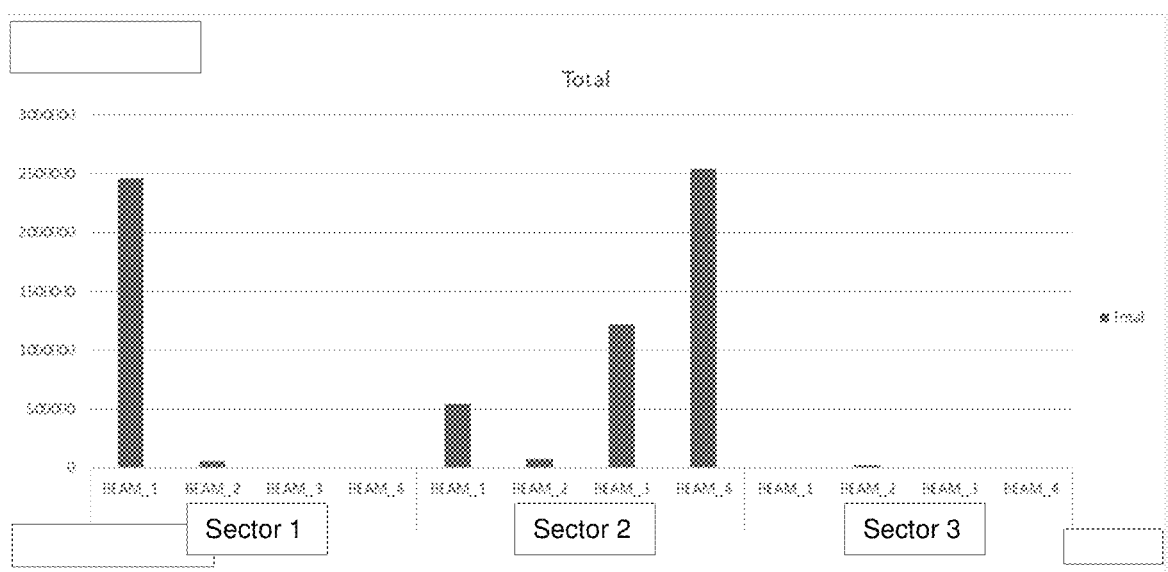

FIGS. 6A-6B show examples of optimizing antenna configurations. The examples comprise beamforming antenna with 3 antenna sectors 1-3, each antenna sector comprises 4 subsectors BEAM_1, BEAM_2, BEAM_3, BEAM_4, and N=0.03. In the example of FIG. 6A, the algorithm proposes to rotate sectors by one beam to the right. This is due to the fact the peak in BEAM_4 of sector 1 causes inter-sector impact to the adjacent beam in adjacent sector. By rotating the antenna configuration by one, the traffic would be served by BEAM_3 of sector 1, the peak would be inside a sector, and the inter-sector impact between sectors decreased. In an uniform azimuth distribution case, the azimuths are changed by 360°/(3*4)=30°. In the example of FIG. 6B, the algorithm proposes to rotate sectors by two beams to the right. This is to move BEAM_1 of sector 1 and BEAM_4 of sector 2 in the middle of the sectors. In an uniform azimuth distribution case, the azimuths are changed by 2*360°/(3*4)= 60°.

The embodiments provide automated methods for optimizing an antenna configuration. An advantage of the method is that a simple and cost-effective method for optimizing antenna directions is provided. Another advantage is that expensive and laborious field measurements can be avoided. Furthermore, testing various antenna configurations can be avoided. Compared to arrangements requiring temporarily setting antenna elements to selected antenna configurations and evaluating the radiating performance of each of the configuration, at least some embodiments of present disclosure enable evaluating various antenna configurations without changing the actual antenna configuration. The reason for this is that the performance of at least some other possible antenna configurations can be evaluated from the performance indicators of the current antenna configuration. Another advantage of the method is that beam level data may significantly improve the accuracy of azimuth direction optimization. In beamforming antennas beam based data is readily available providing directional data of users. Compared to arrangements wherein only the beams of a beamforming antenna are reconfigured, at least some embodiments of the present disclosure may provide tools for optimizing the main antenna direction of the antennas and/or sectorization between the antennas and/or the beams. This is enabled by the gathered beam level performance indicators. Yet another advantage of method is that it may lead to improved user experience in the network due to increased throughput and capacity. A further advantage is that optimized direction of beamforming antennas may be used also to optimize direction of non-beamforming antennas of the same base station.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the aspects of the disclosed embodiments. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the aspects of the disclosed embodiments, and not in limitation thereof. Hence, the scope of the present disclosure is only restricted by the appended patent claims.

The invention claimed is:

1. A computer implemented method for optimizing directions of antennas of a base station of a communications network comprising:
   receiving antenna sector configuration data comprising sector information of each antenna and an azimuth angle of a main antenna direction of each antenna;
   receiving performance indicators of multiple subsectors of each antenna sector, wherein the performance indicators represent an amount of load in a respective subsector;
   calculating a cost function value indicating inter-sector impact between neighboring subsectors of adjacent sectors based on the performance indicators for a current antenna configuration and for at least one other possible antenna configuration; and
   identifying an antenna configuration yielding minimum cost function value of the calculated values as an optimized antenna configuration.

2. The method of claim 1, wherein
   the antenna sectors are horizontal opening angles or opening areas of that antenna;
   the antennas are beamforming antennas; and
   the subsectors are beams of the respective beamforming antenna.

3. The method of claim 1 further comprising:
   providing output information indicating the optimized antenna configuration.

4. The method of claim 1 further comprising:
providing output information indicating the difference of the cost function values of the current antenna configuration and the optimized antenna configuration and/or the cost function values.

5. The method of claim 1, wherein the cost function is such that it provides minimum value when performance indicators of the neighboring subsectors of adjacent sectors indicate minimum load.

6. The method of claim 1, wherein the cost function value is calculated based on sample counts of a performance indicator of the subsectors and/or sample scaling factors determined based on the count of the performance indicator samples in adjacent subsectors of adjacent sectors.

7. The method of claim 1, wherein the base station comprises 2 sectors or 3 sectors or 4 or more sectors.

8. The method of claim 1, wherein each sector comprises 4, 6, 7, 8, or more subsectors or up to 128 subsectors.

9. The method of claim 1, wherein responsive to detecting that the difference of the cost function values of the current antenna configuration and the optimized antenna configuration is greater than a pre-defined threshold value, an antenna configuration change is deployed.

10. The method of claim 1, wherein the optimized antenna configuration is additionally used to optimize direction of an antenna comprising single subsector, if any, of the same base station.

11. An apparatus comprising
a processor, and
a memory including computer program code; the memory and the computer program code configured to, with the processor, cause the apparatus to perform optimization of directions of antennas of a base station of a communications network by receiving antenna sector configuration data comprising sector information of each antenna and an azimuth angle of a main antenna direction of each antenna;
receiving performance indicators of multiple subsectors of each antenna sector, wherein the performance indicators represent an amount of load in a respective subsector;
calculating a cost function value indicating inter-sector impact between neighboring subsectors of adjacent sectors based on the performance indicators for a current antenna configuration and for at least one other possible antenna configuration; and
identifying an antenna configuration yielding minimum cost function value of the calculated values as an optimized antenna configuration.

12. A non-transitory computer program product comprising computer executable program code which when executed by a processor causes an apparatus to perform optimization of directions of antennas of a base station of a communications network by receiving antenna sector configuration data comprising sector information of each antenna and an azimuth angle of a main antenna direction of each antenna;
receiving performance indicators of multiple subsectors of each antenna sector, wherein the performance indicators represent an amount of load in a respective subsector;
calculating a cost function value indicating inter-sector impact between neighboring subsectors of adjacent sectors based on the performance indicators for a current antenna configuration and for at least one other possible antenna configuration; and
identifying an antenna configuration yielding minimum cost function value of the calculated values as an optimized antenna configuration.

* * * * *